United States Patent [19]

Sugiyama

[11] Patent Number: 4,756,463
[45] Date of Patent: Jul. 12, 1988

[54] AUTOMATIC WELDING MACHINE WITH TORCH CARRIAGE BACKLASH PREVENTING MECHANISM

[75] Inventor: Hisao Sugiyama, Aichi, Japan

[73] Assignee: Mitsubishi Denki Kabushiki Kaisha, Tokyo, Japan

[21] Appl. No.: 842,602

[22] Filed: Mar. 21, 1986

[30] Foreign Application Priority Data

Mar. 29, 1985 [JP] Japan ............................... 60-44984[U]
Mar. 29, 1985 [JP] Japan ............................... 60-44985[U]
Mar. 29, 1985 [JP] Japan ............................... 60-44986[U]

[51] Int. Cl.$^4$ .............................................. B23K 5/00
[52] U.S. Cl. .......................................... 228/32; 105/73
[58] Field of Search ................. 228/32; 301/5.3; 104/165; 105/73; 295/9 A, 31 A

[56] References Cited

U.S. PATENT DOCUMENTS 4,175,224 11/1920 Sims ................................... 104/118
4,563,956 1/1986 Wiechert ............................... 104/88

FOREIGN PATENT DOCUMENTS 495713 9/1950 Belgium .
476044 11/1952 Italy .

*Primary Examiner*—Kurt Rowan
*Attorney, Agent, or Firm*—Sughrue, Mion, Zinn, Macpeak & Seas

[57] ABSTRACT

An automatic welding machine includes a welding torch attached to a torch transporting carriage clamped to a guide rail by at least one pair of opposed wheels in contact with opposite sides of the rail. A drive source, connected to an axle of one of the wheels drives the carriage along with rail. At least one of the wheels which roll the carriage along the rail is of elastic material, such as rubber or synthetic resin, having a high coefficient of friction to prevent unwanted movement of the carriage along the rail when the driving power from the drive source is removed.

10 Claims, 3 Drawing Sheets

AUTOMATIC WELDING MACHINE WITH TORCH CARRIAGE BACKLASH PREVENTING MECHANISM

BACKGROUND OF THE INVENTION

1. Field of the Invention

The invention is in the field of automatic welding machines and more particularly in the field of automatic welding machines which include a welding torch attached to a torch transporting carriage.

2. Description of the Prior Art

There are automatic welding machines for welding flat plates and automatic welding machines for welding pipes. In either of such automatic welding machines a welding torch is attached to a torch transporting carriage. The carriage is mounted to a rail by means of at least one pair of opposed wheels which are clamped to opposite sides of the rail. A drive source, such as an electric motor, is connected to an axle of one of the wheels to drive the carriage along the rail through the drive wheel. A pinion may be connected to the drive axle receiving power from the drive source. The pinion cooperates with a rack provided on the rail to facilitate movement of the carriage.

A conventional automatic welding machine and specifically an automatic welding machine for welding flat plates is illustrated in FIGS. 1 through 3. FIG. 1 illustrates a front view of such a welding machine, while FIG. 2 illustrates a plan view of the welding machine of FIG. 1. FIG. 3 is an enlarged sectional view of the drive mechanism section for driving the carriage with power from a drive source.

More specifically, the automatic welding machine of FIGS. 1-3 includes a rail 1 with a rack 2 extending along the longitudinal center line of the rail. A torch transporting carriage 3 is adapted to run on the rail 1 by means of a first pair 4a and a second pair 4b of guide wheels. Each pair of guide wheels is amounted on a respective axle 5a and 5b. Thus, as can be seen in FIG. 2, the wheels run along th top sides of the rail 1 with their respective axles straddling the rack 2. A pinion 6 is mounted on one of the axles 5a in such a manner as to engage the rack 2. A welding torch 7 secured to the carriage 3 by a torch mounting board 8 is transported to selected welding sites by the carriage. The carriage 3 further includes a clamping frame portion 9 with wheels 10a and 10b which roll on the lower surface of the rail 1. The clamping frame 9 is connected to the carriage 3 by means of threaded rods 11 which pass through holes 12 in flange portions at the front and rear of the top portion of the carriage 3 and attach to the front and rear of the clamping frame 9. Threaded clamping pressure actuating members 13 are screwed onto the threaded bars 11 after they are inserted through the holes 12. The carriage is clamped to the rail with a suitable force by adjusting the screwed-down position of the members 13.

As illustrated in FIG. 2, power from the drive axle 5a can be transmitted to the driven axle 5b through a sprocket and chain arrangement consisting of the sprocket 20 on axle 5a, sprocket 22 on axle 5b and the chain 21.

The drive axle 5a receives power from a suitable drive source such as an electric motor 14 through gears 16 and 17 contained in a gear box 15. When the motor is started, gears 15, 16 rotate causing the axle 5a and its pinion 6 to rotate. As the pinion 6 engages the rack 2 of the rail 1 the torch transporting carriage 3 will run along the rail. In this way, the welding torch 7 is moved into various positions facing parts to be welded.

A problem with such a conventional automatic welding machine is that there is an unavoidable backlash in the drive system so that after the carriage has been moved a specified distance in a first or forward direction under power provided by the drive source and thereafter, the drive source power is removed, the carriage has a tendency to move backwards in the direction opposite to the first direction. This results in imprecisely locating the carriage for welding operations. In addition, should the rail not be perfectly level, the carriage may roll out of position when the drive source power is removed, again mislocating the welding torch for the required welding operation.

SUMMARY OF THE INVENTION

It is an object of the invention to eliminate the undesirable movement of the carriage resulting from drive system backlash or a non-level condition of the rail.

According to the teachings of the present invention, an automatic welding machine, including those welding machines for welding flat plates and those welding machines for welding pipes, includes guide wheels at least one of which is made of elastic material, such as rubber or synthetic resin, having a large coefficient of friction. As the guide wheel of elastic material is deformable under pressure, the friction between the rail and the wheel can be easily increased by adjusting the screw-down position of the clamping pressure actuating members threaded to the threaded bars attached to the clamping frame portion of the carriage.

According to a further feature of the present invention, the frictional engagement of the elastic guide wheel with the rail is limited through the use of a stopper ring of non-elastic material coaxially mounted with the elastic guide wheel.

By reason of the high frictional force developed between the rail and the elastic guide wheel or wheels provided according to the teachings of the present invention, the undesirable movement of the carriage due to backlash or otherwise is prevented, thus assuring the exact positioning of the carriage and its welding torch relative to parts to be welded to thereby assure high quality welds.

DESCRIPTION OF THE PREFERRED EMBODIMENTS

Figure 4:
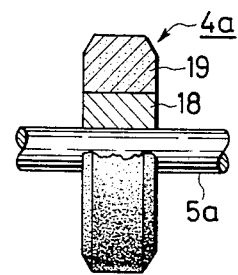
FIG. 4 is a front view, with parts vertically sectioned, of an elastic guide wheel according to the teachings of the present invention.

The preferrd embodiments of the present invention will now be described with reference to the accompanying FIGS. 4 through 10. Referring first to FIG. 4 at least one of the guide wheels 4a consists of an outer ring of elastic material 19 surrounding an inner annular metal core 18. The axle 5a passes through a hole in the annular metal core 18. The elastic material for forming the ring 19 is preferably rubber or synthetic resin. However, the present invention is not limited to an elastic ring of rubber or synthetic resin and any elastic material which can be formed in a ring mounted on a metal core and which can support a torch transporting carriage of an automatic welding machine may be used.

To provide the desired frictional force between the elastic guide wheel 5a and the rail, the screw down amount of the compression force producing numbers 13 are adjusted thereby push the elastic guide wheels against the rail in amount sufficient to allow movement of the carriage 3 under power provided by the drive source while preventing movement due to backlash or a non-level condition of the rail.

Thus, according to the teachings of the present invention at least one of the guide wheels and if desired even all of the guide wheels of the torch transporting carriage 3 ar modified into wheels of elastic material. By this modification, undesirable movement of the carriage due to backlash in the power transmitting drive system as well as undesirable movement caused by other factors such as the non-level condition of the rail is prevented by the frictional force developed between the rail and the elastic guide wheels. Thus, through a relatively simple and inexpensively modification undesirable carriage movement which deteriorates weld quality is positively prevented.

Figure 1:
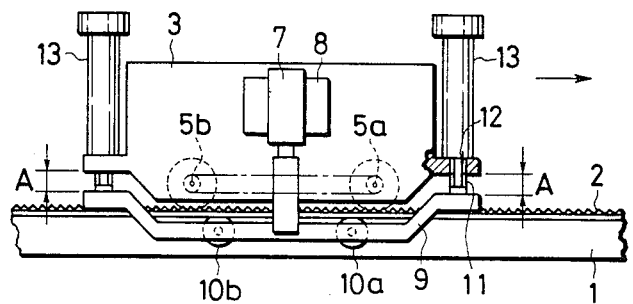
FIG. 1 is a front view of a conventional automatic welding machine for welding flat plates.
Figure 2:
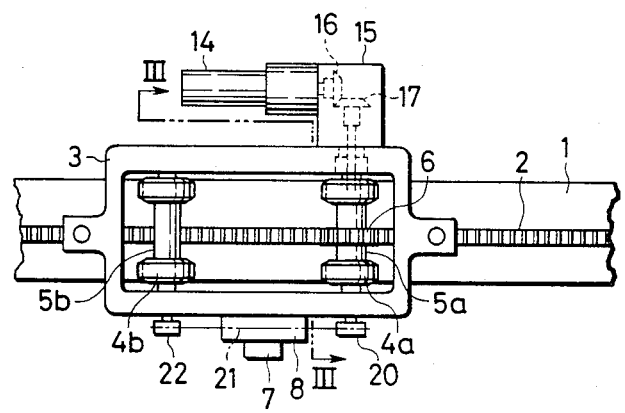
FIG. 2 is a plan view of the conventional automatic welding machine illustrated in FIG. 1.

In the foregoing embodiment of the invention the compression force on the elastic wheel is controlled by adjusting the screw down position of the clamping pressure actuating numbers 13. By this arrangement, the compression force may be gauged by visually monitoring the distance "A" shown in FIG. 1 between the carriage 3 the clamping frame 9.

According to another feature of the invention, the clamping force provided and thus the compression force on the elastic guide wheels are automatically limited through the use of a stopper ring or rings located coaxially with the elastic guide wheels on the axle carrying the elastic guide wheels. In this way operator caused errors resulting from visually gauging the distance "A" is eliminated.

Figure 5:
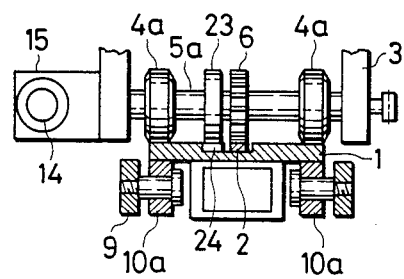
FIG. 5 is an enlarged sectional view illustrating the drive system for driving the torch transporting carriage of an automatic welding machine constructed in accordance with the teachings of the present invention.

In one embodiment of the invention utilizing the stopper ring which embodiment is illustrated in FIG. 5, the stopper 23 is positioned remote from the elastic guide wheels and abuts against the rail to limit the compression of the elastic guide wheels under the clamping force imparted by the clamping pressure actuating members 13.

Figure 3:
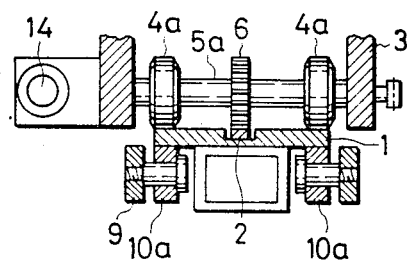
FIG. 3 is an enlarged sectional view of the automatic welding machine of FIGS. 1 and 2 taken along line III—III.

More specifically, and again with reference to FIG. 5, the automatic welding machine with elastic guide wheels 4a mounted on the axle 5a is provided with a stopper ring 23 which cooperates with an suxiliary rail portion 24 buried in the rail 1 in such a manner that it is parallel with the rack 2 and flush with the top of the rail 1. Components of FIG. 5 which have previously been described with reference to FIG. 3 are designated with common reference numbers and characters. Their description will not be repeated wth reference to FIG. 5.

Figure 6:
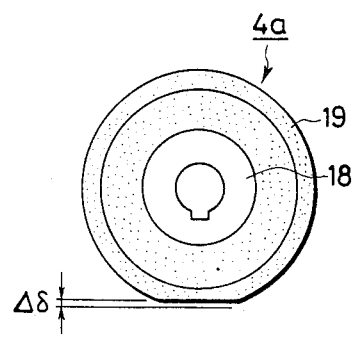
FIG. 6 illustrates the deformation of the elastic guide wheel of the present invention under a compression force applied to the wheel.

It is thus apparent that the deformation amount $\Delta\lambda$ of the elastic guide wheels 4a illustrated in FIG. 6 is limited by the stopper ring 23 and its cooperating auxiliary rail 24. That is, once the stopper ring 23 abuts against the auxiliary rail 24 it is no longer possible to further deform the elastic wheels 4a against the rail 1. In this way, the wheel pressure of the elastic guide wheels 4a against the rail 1 and the engagment of the pinion 6 with the rack 2 can be maintained constant.

Figure 7:
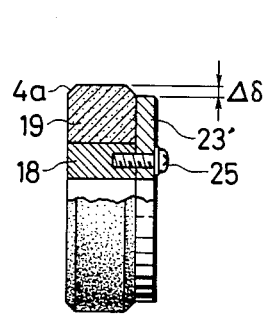
FIG. 7 is a front view, with vertically sectioned parts, of an elastic wheel according to the teachings of the present invention with a stopper ring for limiting compression of the elastic wheel.

FIG. 7 illustrates an alternate embodiment of the stopper ring. In accordance with the embodiment of FIG. 7, the stopper ring 23' is mounted directly on the elastic guide wheel 4a. One mounting arrangement utilizes the screw 25 which is screwed into a threaded bore of the annular metal core 18. Other suitable mounting means may also be used. It is to be understood that the present invention is not to be limited to any specific mounting means for mounting the stopper ring 23' to the elastic guide wheel 4a.

Figure 8:
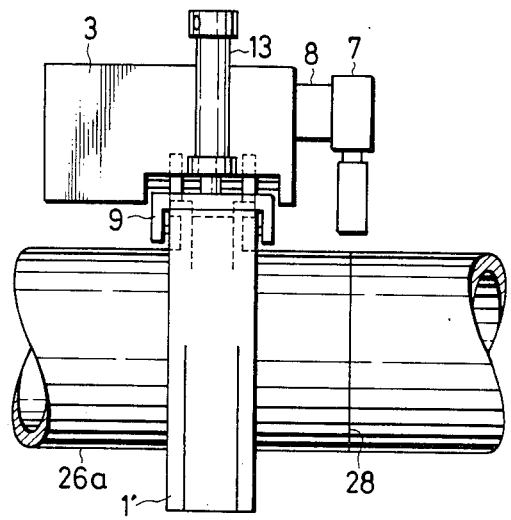
FIG. 8 is a front view of an automatic welding machine according to the teachings of the present invention for use in welding pipes.
Figure 9:
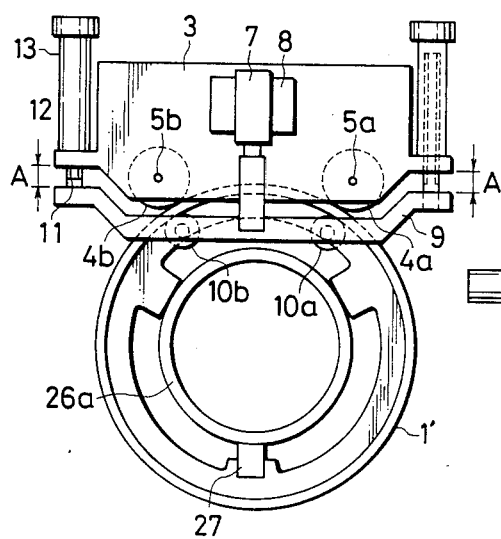
FIG. 9 is a side view of the welding machine of FIG. 8.
Figure 10:
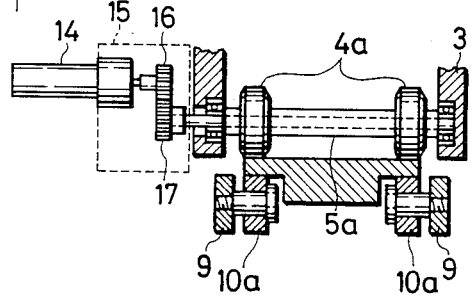
FIG. 10 is an enlarged sectional view of the drive system of the automatic welding machine for welding pipes illustrated in FIG. 8.

FIGS. 8, 9 and 10 illustrate the application for the invention to an automatic welding machine for welding pipes.

Components illustrated in FIGS. 8 through 10 which have previously been described with reference to FIGS. 1 through 7 are represented with the same reference numbers and characters previously used to designate such components and will not be described further with reference to FIGS. 8 through 10.

Referring specifically to FIGS. 8 through 10, a rail 1' is clamped to a pipe 26a by means of a screw 27. A welding torch transporting carriage 3 is clamped to the rail 1' with guide wheels 4a and 4b mounted on axles 5a and 5b, respectively. As with the arrangement of the embodiment of the invention for use with an automatic welding machine for welding flat plates, the carriage 3 provided with a clamping frame 9 having clamping guide wheels 10a and 10b which ride along the underside of the rail 1'. At least one of the wheels 4a and 4b is an elastic wheel made of rubber or synthetic resin. The guide wheels 4a, 4b and the clamping guide wheels 10a, 10b cooperate to allow the carriage 3 to roll around the periphery of the rail 1' whereby locating the welding torch 7, secured to the carriage 3 through the torch mounting board 8, at specific locations 28 about the periphery of the pipe 26a where welding operations are to take place. While not specifically illustrated in FIGS. 8, 9 and 10, it is to understood that, as with the embodiment of the invention utilized with the automatic welding machine for welding flat plates, the embodiment of the invention utilized in automatic welding machines for welding pipes may include stopper rings of the type illustrated in either FIGS. 5 or 7.

From the foregoing it can be seen that the problem of unwanted carriage movement caused by drive system backlash or otherwise when the drive power is removed from the carriage is eliminated according to the teachings of the present invention by modifying at least one of the carriage guide wheels for which roll on the rail associated with the carriage to be of elastic material, such as rubber or synthetic resin, which material exhibits a high coefficient of friction with the rail. The elastic guide wheels are compressed again the rail to increase the friction there between through the use of clamping pressure actuating members cooperating with threaded rods on a clamping frame of the carriage. The clamping pressure can be visually gauged by the operator. However, to prevent an excessive deformation force between the elastic guide wheels and the rail, and thus an excessive deformation Δλ there may be provided guide rings coaxially mounted with the elastic guide wheels on a common axle. The guide rings may be mounted either separate from or on the elastic wheels and have a diameter equal to the desired diameter of the elastic guide wheel after they have undergone the maximum desired compression force.

The invention has been described with reference to preferred embodiments thereof. It is to be understood that the invention is not to be limited by the specific preferred embodiments described herein and that other embodiments of the invention are to be included within the spirit and the scope of the present invention which shall be limited only by the claims hereof.

What is claimd is:

1. An automatic welding machine with a welding torch and a drive source provided on a torch transporting carriage to be moved on a rail, comprising:

at least one pair of wheels, at least one of the wheels of said pair being an elastic wheel with a large coefficient of friction deformable under pressure;

means for clamping said carriage to said rail;

a driving axle receiving power from said drive source;

means connected to said driving axle and rail for moving said carriage when said driving axle receives power from said drive source;

means for adjusting the clamping force produced by said clamping means to increase the friction between said deformable elastic wheel and said rail so that backlash and roll are prevented when driving power is removed; and at least one stopper ring mounted coaxially with said at least one elastic wheel and having a diameter smaller than that of said elastic wheel for limiting the compression of said elastic wheel on the rail.

2. An automatic welding machine as claimed in claim 1, wherein said at least one elastic wheel is a rubber wheel.

3. An automatic welding machine as claimed in claim 1, wherein said at least one elastic wheel is synthetic resin wheel.

4. An automatic welding machine as claimed in claim 1, wherein said automatic welding machine is an automatic welding machine for welding flat plates.

5. An automatic welding machine as claimed in claim 1, wherein said automatic welding machine is automatic welding machine for welding pipes.

6. An automatic welding machine as claimed in claim 4, wherein said stopper ring is mounted on said driving axle.

7. An automatic welding machine as claimed in claim 5, wherein said stopper ring is mounted on the side wall of said elastic wheel.

8. An automatic welding machine as claimed in claim 1, wherein said connecting means comprises a pinion attached to said driving axle, said driving axle being attached to said carriage, and a rack engageable with said pinion attached to said rail.

9. An automatic welding machine as claimed in claim 8, wherein said driving axle also carries said elastic wheel.

10. An automatic welding machine as claimed in claim 9, wherein said carriage includes a top portion carrying said torch, said clamping means includes a clamping frame and at least one threaded rod attached to said top portion and said clamping frame, and said clamping force adjusting means includes a clamping pressure actuating member attached to said threaded rod, the other wheel of said at least one pair of wheels being attached to said clamping frame whereby adjustments of said clamping pressure actuating member adjusts the clamping pressure of said at least one pair of wheels on said rail.

* * * * *